(12) United States Patent
Lin et al.

(10) Patent No.: US 11,982,802 B2
(45) Date of Patent: May 14, 2024

(54) DEVICE AND METHOD FOR PERFORMING TOTAL INTERNAL REFLECTION SCATTERING MEASUREMENT

(71) Applicant: Chung Yuan Christian University, Taoyuan (TW)

(72) Inventors: Cheng-An Lin, Taoyuan (TW); Tzu-Yin Hou, Yunlin County (TW); You-Wei Li, Yilan County (TW); Yuh-Show Tsai, New Taipei (TW); Ming-Chen Wang, Taoyuan (TW)

(73) Assignee: Chung Yuan Christian University, Taoyuan (TW)

( * ) Notice: Subject to any disclaimer, the term of this patent is extended or adjusted under 35 U.S.C. 154(b) by 308 days.

(21) Appl. No.: 17/710,103

(22) Filed: Mar. 31, 2022

(65) Prior Publication Data

US 2023/0314786 A1    Oct. 5, 2023

(51) Int. Cl.
*G02B 21/34*      (2006.01)
*G02B 21/06*      (2006.01)
*G01N 21/47*      (2006.01)

(52) U.S. Cl.
CPC ............ *G02B 21/34* (2013.01); *G02B 21/06* (2013.01); *G01N 21/47* (2013.01)

(58) Field of Classification Search
CPC ........ G02B 21/34; G02B 21/06; G01N 21/47; G01N 2021/479
USPC .......................................... 356/128, 239, 338
See application file for complete search history.

(56) References Cited

U.S. PATENT DOCUMENTS

| | | | | |
|---|---|---|---|---|
| 10,859,873 | B2* | 12/2020 | Kang | G02F 1/133617 |
| 11,079,604 | B2* | 8/2021 | Frank | G03F 1/84 |
| 11,614,405 | B2* | 3/2023 | Connolly | G01N 35/00 356/317 |
| 11,703,445 | B2* | 7/2023 | Hsieh | G01N 21/6454 356/300 |
| 2012/0306861 | A1* | 12/2012 | Minami | G02B 30/30 362/602 |
| 2017/0317243 | A1* | 11/2017 | Park | H01L 33/486 |
| 2019/0155337 | A1* | 5/2019 | Ohkawa | G02B 27/0172 |
| 2020/0266227 | A1* | 8/2020 | Wang | H01L 31/105 |
| 2021/0173258 | A1* | 6/2021 | Wang | G02F 1/133606 |
| 2021/0397049 | A1* | 12/2021 | Allen | G02F 1/133524 |

* cited by examiner

*Primary Examiner* — Isiaka O Akanbi
(74) *Attorney, Agent, or Firm* — NZ CARR LAW OFFICE

(57) ABSTRACT

Disclosed herein are device and method for performing a total internal reflection scattering (TIRS) measurement to a sample slide. The device comprises a first reflective plate having a first opening; a second reflective plate having second and third openings and disposed on top of the first reflective plate thereby forming a slot therebetween for accommodating the sample slide, wherein the first opening of the first reflective plate is disposed directly underneath the second opening of the second reflective plate; a white light source disposed in the space formed by the third opening of the second reflective plate and configured to emit a white light into the slot; and a first blackout layer disposed on top of the third opening thereby covering the white light source and keeping the emitted white light from leaking. When the sample slide is inserted into the slot, the white light source illuminates the sample slide so as to achieve the TIRS measurement to the sample slide.

13 Claims, 4 Drawing Sheets

DEVICE AND METHOD FOR PERFORMING TOTAL INTERNAL REFLECTION SCATTERING MEASUREMENT

BACKGROUND OF THE INVENTION

1. Field of the Invention

The present disclosure relates to devices and methods for performing total internal reflection scattering (TIRS) measurements to sample slides. More particularly, the disclosed invention relates to the method for performing the TIRS measurement to the sample slide accommodated in the device.

2. Description of Related Art

Dark-field microscopy (DFM) has been a powerful optical tool due to its balance between the imaging background and visibility by creating a dark-field background/vision for imaging objects since its invention in $19^{th}$ century. The basic working model of DFM is the light scattering of the subjects in the focal plane of oblique illumination that is transferred into the objective lens. Optionally, DFM can be used with total internal reflection fluorescence (TIRF) microscopy, thereby enhancing contrast of the imaging object with the aid of the scattered light from the evanescent field in the vicinity of a dielectric interface. Hence, various imaging probes (e.g., metal nanoparticles and/or fluorophores) with high scattering efficiency are developed and used to facilitate detection of the imaging objects under scattering and/or fluorescence microcopies.

In order to achieve dark-field vision, a specific kit including a dark-field condenser, immersion oils and oil immersion objectives is commonly used to increase resolving power. However, it remains difficult to attach automated microscopes to traditional dark-field vision. An optimal dark-field vision only occurs under high magnification because of the diffraction limit, thereby restricting the vision into a small area and causing uneven brightness of the view. On the other hand, when used with TIRF microscopy, imaging of TIRF relies on excitation of fluorophores coupled to samples (e.g., surfaces of cells), when the unbound fluorophores outnumber that of the bound one, background noises would be too intense to be clearly imaged. The evanescent electromagnetic field decays exponentially from the interface, and thus penetrates to a depth of only 100 nm into the sample medium, resulting the restricted image along vertical axis.

In view of the foregoing, there exists in the related art a need of an improved and operable device for enhancing brightness of view and creating a larger dark-field of view under microscopes.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

As embodied and broadly described herein, one aspect of the present disclosure is directed to a device for performing a total internal reflection scattering (TIRS) measurement to a sample slide under a microscope. The device comprises a first reflective plate having a first opening; a second reflective plate having a second and at least one third openings and disposed above the first reflective plate thereby defining a slot therebetween for accommodating the sample slide, wherein the first opening of the first reflective plate is disposed directly underneath the second opening of the second reflective plate; at least one light source disposed in the space formed by the third opening of the second reflective plate and configured to emit a light into the slot to illuminate the sample slide accommodated therein; and a first blackout layer disposed on top of the third opening thereby covering the light source and keeping the emitted light from leaking. In the device, the sample slide accommodated in the slot has an edge being directly disposed underneath the light source, and the light is reflected inside the slot and the sample slide thereby achieving the TIRS measurement to the sample slide.

In some preferred embodiments, the light source is in the form of a light-emitting diode.

According to some embodiments of the present disclosure, the device further comprises a second blackout layer disposed opposite to the first blackout layer, wherein the second blackout layer covers at least a portion of the slot.

According to some embodiments of the present disclosure, each of the first and second blackout layers are in the form of a shading fabric or a shading tape independently coated with a layer of blackout paint.

According to optional embodiments of the present disclosure, the device further comprises an adhesive element disposed between the first and second reflective plates for holding them together.

In some working embodiments, the adhesive element may be any one of a sticker, a hook-and-loop-fastener, a magnet or a sucker.

According to optional embodiments of the present disclosure, the first reflective plate or the second reflective plate has a protruding structure formed on its surface for connecting to each other.

Another aspect of the present disclosure is directed to a method for performing a total internal reflection scattering (TIRS) measurement to a sample slide via the device of the present disclosure under a microscope, comprising: (a) placing the device of the present disclosure under the microscope; and (b) inserting the sample slide into the slot formed between the first and second reflective plates of the device; and (c) turning on the light source to illuminate the slot and the sample slide so as to achieve the TIRS measurement to the sample slide.

According to some embodiments of the present disclosure, in step (b), the sample slide inserted into the slot does not occupy the entire space therein.

In some embodiments of the present disclosure, the light source is in the form of a light-emitting diode.

According to optional embodiments of the present disclosure, the device further comprises an adhesive element disposed between the first and second reflective plates for holding them together.

Examples of the adhesive element is a sticker, a hook-and-loop-fastener, a magnet or a sucker.

Many of the attendant features and advantages of the present disclosure will becomes better understood with reference to the following detailed description considered in connection with the accompanying drawings.

BRIEF DESCRIPTION OF THE DRAWINGS

The present description will be better understood from the following detailed description read in light of the accompanying drawings, where.

Figure 1A:
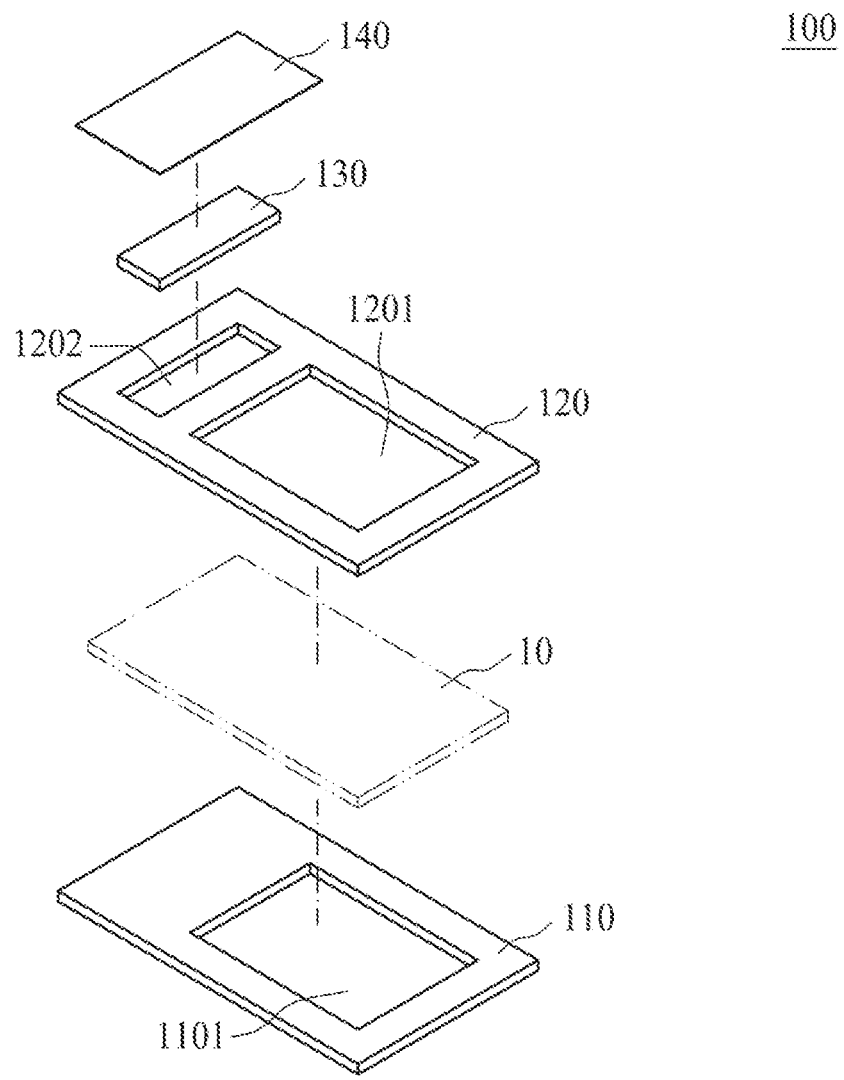
FIG. 1A is an exploded view of an exemplary device 100 according to one embodiment of the present disclosure.

In accordance with common practice, the various described features/elements are not drawn to scale but instead are drawn to best illustrate specific features/elements relevant to the present invention. Also, like reference numerals and designations in the various drawings are used to indicate like elements/parts.

DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

1. DEFINITIONS

For convenience, certain terms employed in the specification, examples and appended claims are collected here. Unless defined otherwise, all technical and scientific terms used herein have the same meaning as commonly understood by one of the ordinary skill in the art to which this invention belongs.

The singular forms "a", "and", and "the" are used herein to include plural referents unless the context clearly dictates otherwise.

The term "total internal reflection scattering (TIRS)" as used herein refers to an optical phenomenon in which the light is scattered from an evanescent wave by microscopic particles that come close enough to a boundary or an interface between two materials with different refractive indexes, in which a total internal reflection (TIR) simultaneously occurs when the light waves are incident at a sufficiently oblique angle on the boundary from one material with a higher refractive index to another material having a lower refractive index. The random interference of the light scattered by many particles gives rise to a speckle field that can be studied by microscopes. According to the present embodiments, the TIRS is performed into a sample slide by the present device and method.

The terms "above", "on" and "underneath" used herein are individually to describe one element or feature's spatial relationship to another element(s) or feature(s) as illustrated in the figures. Specially, the term "on" refers to one element that is physically in contact with and supported by (a surface) of another element, while the term "above" used herein refers to one element may be disposed in an extended space or distance over and not physically touching another element. In one embodiment of the preset disclosure, one reflective plate is disposed "above" another reflective plate so as to create a slot therebetween. On the other hand, the term "underneath" refers to a spatial relationship that one element is placed or situated directly below another element, either with or without physical touch. According to the present embodiments, one opening of one reflective plate is disposed directly underneath another opening of another reflective plate, thereby allowing a sample slide disposed in the slot can be viewed therethrough.

2. DETAIL DESCRIPTION OF PREFERRED EMBODIMENTS

The present disclosure is based, at least in part, on the discovery of a total internal reflection may be achieved in a glass microscope slide loaded in the novel device of this disclosure and illuminated with a visible light, in which the brightness of dark-filed vision of the slide is significantly enhanced. Accordingly, the present disclosure provides a novel device for performing a total internal reflection scattering (TIRS) measurement to a sample under a microscope, preferably under a dark-field microscope. Also disclosed herein is a method for performing the TIRS measurement via the present device.

The present disclosure aims at providing a novel device for use with a sample slide under a microscope, so as to perform a TIRS measurement to the sample slide.

2.1 The Present Device and the Operating Method Thereof

Figure 1B:
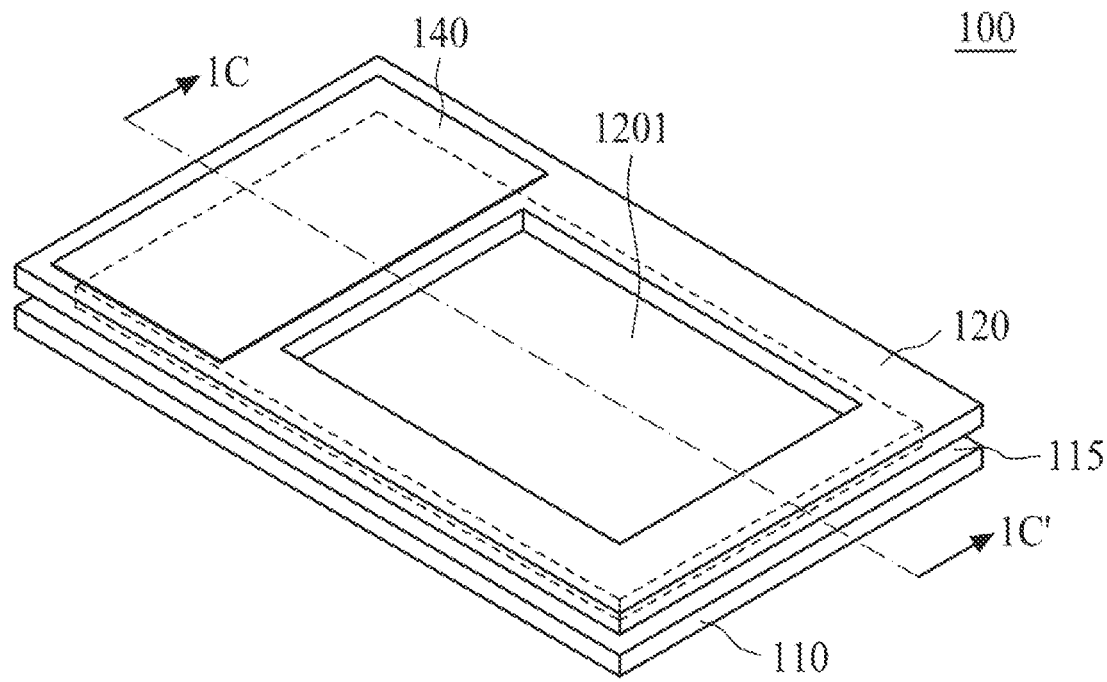
FIG. 1B is a perspective view of the device 100 of FIG. 1A after assembling.
Figure 1C:
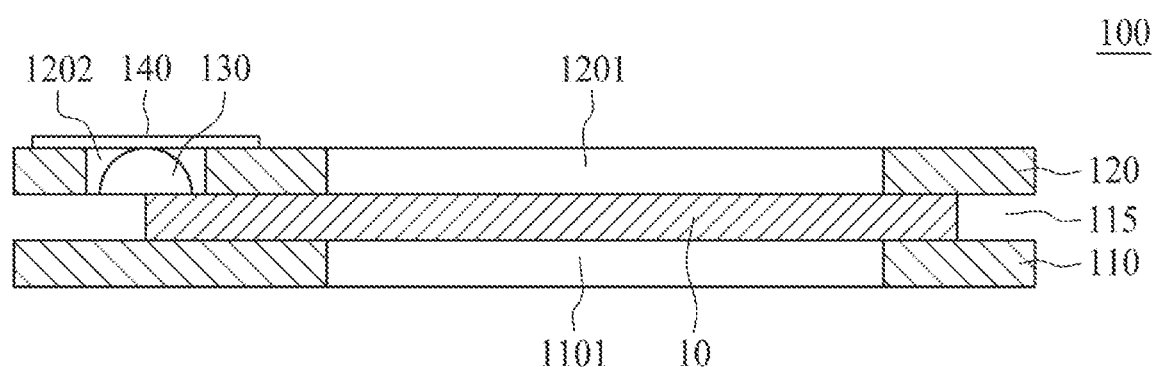
FIG. 1C is a sectional view of the device 100 of FIG. 1B.

Referring more particularly to FIGS. 1A to 1C, in which FIG. 1A is an exploded view of an exemplary device 100 according to one embodiment of the present disclosure; FIG. 1B is a perspective view of the device 100 of FIG. 1A after assembling; and FIG. 1C is a cross-sectional view of the device 100 of FIG. 1B along the line 1C-1C'. The device 100 comprises in its structure, a first reflective plate 110, a second reflective plate 120, a light source 130 and a first blackout layer 140, in which the first reflective plate 110 has a first opening 1101, and the second reflective plate 120 has a second opening 1201 and a third opening 1202.

To construct the device 100, the second reflective plate 120 is placed above the first reflective plate 110 with the second opening 1201 of the second reflective plate 120 being directly above the first opening 1101 of the first reflective plate 110, thereby defining a slot 115 between the first and second reflective plates (110, 120) for accommodating a sample slide 10 (e.g., a cover glass containing a sample thereon) therein. The light source 130 serves the purpose of illuminating the sample slide 10 accommodated inside the slot 115. Specifically, the light source 130, which is made of at least one light-emitting diodes (LEDs), is disposed in the space formed by the third opening 1202 of the second reflective plate 120 with the LEDs facing downward thereby emitting lights into the slot 115 (FIG. 1C). It should be noted that the number and position of light source 130 can vary according to practical needs, and are not limited by FIGS. 1A to 1C, in which the light source 130 is substantially disposed at one side of the device 100. For instance, in an alternative arrangement, four light sources may be disposed around the four sides of the device 100, respectively. Various forms and colors of LEDs may be used as the light source 130 of the present device 100, including but is not limited to, surface mounted white light-emitting diodes (SMD LEDs) as exemplified in FIGS. 1A to 1C. For the purpose of conducting TIRS measurement, the sample slide 10 is inserted into the slot 115, with a part of the sample slide 10 being disposed in the space formed by the first and second openings 1101, 1201, thereby allowing a user to view the part of the sample slide 10 therethrough under a microscope (FIGS. 1B and 1C). When inserted into the slot 115, the sample slide 10 does not occupy the entire space of the slot 115. Preferably, the sample slide 10 is inserted into the slot 115 in a manner that the light source 130 overhangs one short edge of the sample slide 10; more preferably, the sample slide 10 is disposed in a manner that one of its edges is directly underneath the light source 130 (FIG. 1C). Finally, a blackout layer 140 is disposed on top of the third opening 1202 to cover the light source 130 and prevent the emitted light from leaking out of the device 100. By this configuration, when the light source 130 is turned on, the emitted light is reflected inside the slot 115 and the sample slide 10, preferably, the sample housed in the sample slide 10 is labeled with gold nanoparticles, thereby achieving the desired TIRS measurement to the sample slide 10.

The first and second reflective plates (110 and 120) can be made of any solid material that possesses reflective properties (e.g., metals) or is coated with a layer of reflective paints (e.g., acrylic paints with micro glass beads). In one working example, the first and second reflective plates (110 and 120) are respectively made of acrylic sheets coated with a silver paint. As to the blackout layer 140, it may be made of any material that is opaque or capable of absorbing lights. Exemplary materials suitable for making the blackout layer may be a shading fabric or a shading tape, which is coated with a layer of blackout paint to block out any incident light.

2.2 the Alternative Design of the Present Device

Figure 2:
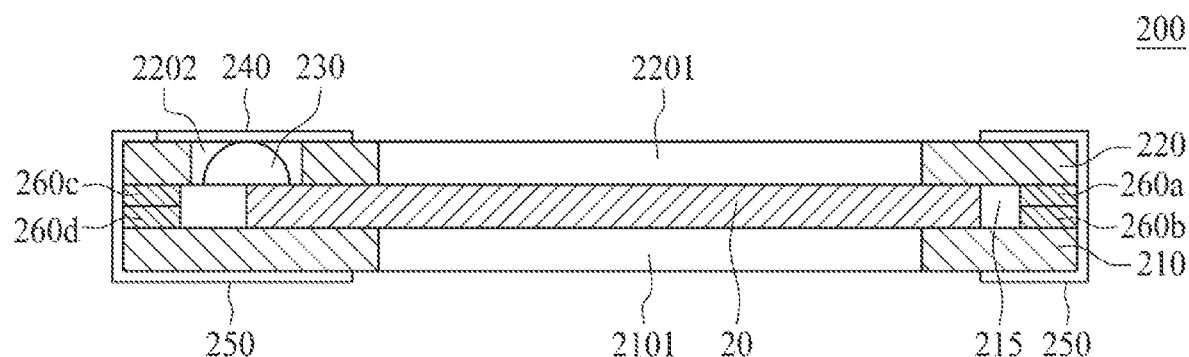
FIG. 2 is sectional view of a device 200 in accordance with first alternative embodiment of the present disclosure.

In one alternative embodiment, as depicted in FIG. 2, in addition to the components of the device 100 described above in FIGS. 1A to 1C, the device 200 in this embodiment further includes a second blackout layer 250 and an adhesive element 260. As most of the components and parts in the device 200 are same as those in the device 100, thus the same components and parts are denoted by the common numbering elements. For example, the first and second reflective plates in FIG. 1 are 110 and 120, while in FIG. 2 are 210 and 220; the first, second and third openings in FIG. 1 are 1101, 1201, and 1202, while in FIG. 2 are 2101, 2201, and 2202, and so on.

In this embodiment, the second blackout layer 250 is disposed opposite to the first blackout layer 240 and covers at least one end of the slot 215, preferably, both ends of the slot 215. Most preferably, the second blackout layer 250 is wrapped around the first and second reflective plates (210, 220) and covers the peripheral area of one end of the slot 215 (FIG. 2). The first and second blackout layers (240, 250) may be made of the same material of the first blackout layer 140 described above.

The adhesive element 260 is disposed between the first and second reflective plates (210, 220) to hold the two plates (210, 220) together. Examples of the adhesive element 260 suitable for use in the present disclosure include a sticker, a hook-and-loop-fastener, a magnet, a sucker and the like. The number and form of the adhesive element 260 can vary according to practical needs, for example, a total number of 1, 2, 3, 4, 5, 6, 7, 8, 9, or 10 adhesive element 260 may be used to hold the plates (210, 220) together. It should be noted that the adhesive element 260 depicted in FIG. 2 is exemplified as four magnets 260a, 260b, 260c, and 260d, collectively act to magnetically holding the two reflective plates 210, 220 together, with two of them being disposed on the upper surface of the first reflective plate 210, and the other two being disposed on the lower surface of the second reflective plate 220.

Figure 3:
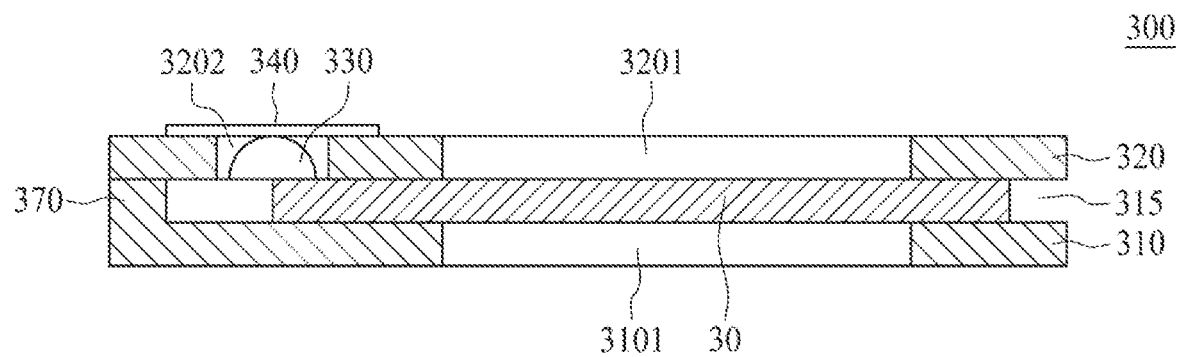
FIG. 3 is sectional view of a device 300 in in accordance with second alternative embodiment of the present disclosure.

Reference is now made to FIG. 3, which is directed to a device 300 in accordance with a second alternative embodiment of the present disclosure for performing TIRS measurement on a sample slide under a microscope. In general, the components of device 300 in this embodiment are same as those in the device 100 as depicted in FIGS. 1A to 1C, except the first and/or second reflective plates (310, 320).

As most of the components and parts in the device 300 are same as those in the device 100, thus the same components are denoted by the common numbering elements; for example, the first reflective plate in FIGS. 1A to 1C is 110, while in FIG. 3 is 310; the second reflective plate depicted in FIG. 1A is 120, while in FIG. 3 is 320 and so on.

The first and second reflective plates (310, 320) in this embodiment differ from those in the device 100 in that each of the first and second reflective plates 310, 320 further includes a protruding structure for coupling with the other reflective plate. As depicted in FIG. 3, the first reflective plate 310 has a protruding structure 370 formed on its surface, and is attached to the second reflective plate 320 at a site approximating to the third opening 3202, thereby creating a distance or space (i.e., a slot 315) between the first and second reflective plates (310, 320) for subsequently accommodating a sample slide 30 therein; in addition, the protruding structure 370 may also prevent light from leaking out of the slot 315. It should be noted that the protruding structure 370 depicted in FIG. 3 is exemplified as integrally formed with the first reflective plate 310 in to a single piece, but is not limited thereto. An alternative example of the protruding structure 370 of one reflective plate is a tenon tongue capable of fitting a mortise hole formed on the other reflective plate (e.g., the second reflective plate 320 of this embodiment), so as to couple two reflective plates together.

Figure 4:
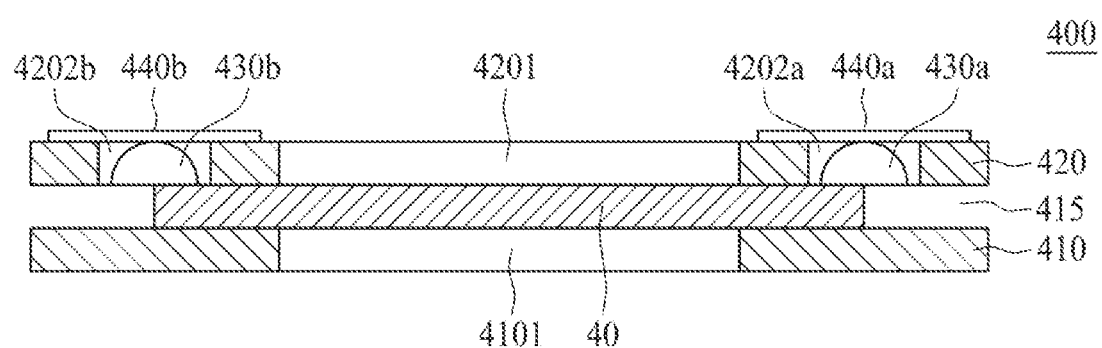
FIG. 4 is sectional view of a device 400 in accordance with third alternative embodiment of the present disclosure.

FIG. 4 depicts a device 400 according to third alternative embodiment of the present disclosure. In general, the components of device 400 in this embodiment are same as those in the device 100 as depicted in FIGS. 1A to 1C, except the number of the third openings (4202a, 4202b), the light sources (430a, 430b), and the first blackout layers (440a, 440b). As most of the components and parts in the device 400 are same as those in the device 100, thus the same components and parts are denoted by the common numbering elements. For example, the first and second reflective plates in FIG. 1 are 110 and 120, while in FIG. 4 are 410 and 420; the first and second openings in FIG. 1 are 1101 and 1201, while in FIG. 4 are 4101 and 4201, and so on.

The second reflective plate 420 in this embodiment has one second opening 4201 and two third openings (4202a, 4202b) respectively disposed at opposite sides of the second reflective plate 420. Each third openings (4202a, 4202b) may house a light source (430a or 430b), such as an LED array therein. Each LED array is disposed face-down to emit lights into the slot 415. Same as the configuration of device 100, the sample slide 40 is inserted into the slot 415 in a manner that each light source (430a or 430b) overhangs the short edge of the sample slide 40; more preferably, the sample slide 40 is disposed in a manner that its edges are directly underneath the light sources (430a, 430b). Finally, two first blackout layers (440a, 440b) are respectively disposed on top of the third openings (4202a, 4202b) to cover the light sources (430a, 430b) and prevent the emitted light from leaking out of the device 400.

In view of the foregoing, the device of the present disclosure is advantageous in having a light source disposed in the space formed by the third opening of the second reflective plate for emitting a light into the slot formed between the first and second reflective plates. Hence, the emitted light is reflected inside the slot and the sample slide, thereby achieving the total internal reflection scattering (TIRS) measurement to the sample slide. By the virtue of the above features, the present device serves as a sample slide platform for supporting the sample slide under a dark-field vision, thereby enhancing the brightness and resolution of the microscopic images.

EXAMPLES

Materials and Methods

The Construction of the Present Device

Two acrylic plates were respectively engraved with the pattern depicted in FIG. 1A by laser, with the first plate being engraved with one opening (i.e., the first opening), and the second plate being engraved with two openings (i.e., the second and third openings). The first and second plates were held together via magnetic strips with a slot space formed therebetween. The slot was for subsequent accommodating a microscopic slide therein. Then, the two engraved plates were fully covered by silver shading tapes. Six surface-mount-device white light-emitting diodes (SMD LEDs) were placed in the space formed by the third opening of the second plate, and then covered with silver shading tapes.

The Illuminating Examination of the Present Device

Two batches of gold nanoparticles about 40 nm and 60 nm in diameters (BBI solution, UK) were serial-diluted and individually added to wells of a 24-well microplate that was coated with polydimethylsiloxane (PDMS). The concentrations of gold nanoparticles were denoted by optical densities (O.D.), which were 1, 0.5, 0.25, 0.125, 0.0625, and 0.03125 O.D., respectively. The 24-well microplate were placed on the sample slide inserted into the slot of the present device for examination under the inverted microscope (Zeiss Axiovert 200M).

Image Analysis of Cellular Uptake of Gold Nanoparticles

The mouse macrophage cell line RAW264.7 was obtained from American Type Culture Collection (ATCC), and cultivated in DMEM medium supplemented with 5% FBS, 100 U/ml penicillin and 100 µg/ml streptomycin and placed in the cell culture chamber at 37° C. in a humidified atmosphere with 5% $CO_2$. For TIRS measurement, 1 ml of the DMEM medium with cultivated RAW264.7 cells were added onto a sample slide (cell numbers are about $1\times10^6$ cells), and cultivated for 24 h before further one-hour incubation with 1 ml of gold nanoparticles. The sample slide was disposed into the present device and examined under the inverted microscope (Zeiss Axiovert 200M).

Example 1 Measurement of Total Internal Reflection Scattering (TIRS) of a Sample with the Aid of the Present Device The present device was constructed in accordance with the method described in the "Materials and Methods" section. Sample slides of bare gold nanoparticles at various concentrations and sample slides of RAW264.7 cells co-cultivated with gold nanoparticles were respectively prepared in accordance with procedures described in the "Materials and Methods" section before being subjected to TIRS measurement.

To test the present device, bare gold nanoparticles at various concentrations were excited and examined under an inverted microscope to confirm the presence or absence of TIRS in the sample slide. It was found that nanoscale scattering images of bare gold nanoparticles could be successfully taken at a high resolution due to the improved brightness.

Further, to verify the effect of the device on the interaction between gold nanoparticles and cells, gold nanoparticles were co-cultivated with the RAW264.7 cells and the scattered light therefrom was analyzed. It was found that a scattering light was formed on the surface of the microscope slide, thereby increasing the clarity of inner structure of cells under the dark filed. Moreover, the focuses of the cell samples under the microscope could be continuously adjusted along the Z axis without changing objective lenses. When the gold nanoparticles and the cells were simultaneously clear at the same focus plane, it was an indication that the gold nanoparticles have been successfully taken into the macrophages. On the contrary, when gold nanoparticles were not at the same focus plane as that of the cells (i.e., but were at the same focus plane as that of the background) indicated that gold nanoparticles had not been taken by the cells.

In conclusion, the present disclosure provides a novel device for creating a bright view by performing a total internal reflection scattering (TIRS) in the sample slide, thereby enhancing the view of dark-field vision. Hence, the present disclosure provides a condenser-free illuminator suitable for use with various types of microscopes.

It will be understood that the above description of embodiments is given by way of example only and that various modifications may be made by those with ordinary skill in the art. The above specification, examples, and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A device for performing a total internal reflection scattering (TIRS) measurement to a sample slide under a microscope, comprising:
    a first reflective plate having a first opening;
    a second reflective plate having a second and at least one third openings and disposed above the first reflective plate thereby defining a slot therebetween for accommodating the sample slide, wherein the first opening of the first reflective plate is disposed directly underneath the second opening of the second reflective plate;
    a light source disposed in the space formed by the third opening of the second reflective plate and configured to emit a light into the slot to illuminate the sample slide accommodated therein; and
    a first blackout layer disposed on top of the third opening thereby covering the light source and keeping the emitted light from leaking;
    wherein, the sample slide accommodated in the slot has an edge being directly disposed underneath the light source, and the emitted light is reflected inside the slot and the sample slide thereby achieving the TIRS measurement to the sample slide.

2. The device of claim 1, wherein the light source is in the form of a light-emitting diode.

3. The device of claim 1, wherein the first blackout layer is in the form of a shading fabric or a shading tape independently coated with a layer of blackout paint.

4. The device of claim 1, further comprising a second blackout layer disposed opposite to the first blackout layer, wherein the second blackout layer covers at least a portion of the slot.

5. The device of claim 4, wherein the second blackout layer is in the form of a shading fabric or a shading tape independently coated with a layer of blackout paint.

6. The device of claim 1, further comprising an adhesive element disposed between the first and second reflective plates for holding them together.

7. The device of claim 6, wherein the adhesive element is any one of a sticker, a hook-and-loop-fastener, a magnet or a sucker.

8. The device of claim 1, wherein the first reflective plate or the second reflective plate has a protruding structure formed on its surface for connecting to each other.

9. A method for performing a total internal reflection scattering (TIRS) measurement to a sample slide via the device of claim 1 under a microscope, comprising:

(a) placing the device of claim 1 under the microscope;

(b) inserting the sample slide into the slot formed between the first and second reflective plates of the device of claim 1; and (c) turning on the light source to illuminate the slot and the sample slide so as to achieve the TIRS measurement to the sample slide.

10. The method of claim 9, wherein in step (b), the sample slide inserted into the slot does not occupy the entire space therein.

11. The method of claim 9, wherein the light source is in the form of a light-emitting diode.

12. The method of claim 9, wherein the device further comprises an adhesive element disposed between the first and second reflective plates for holding them together.

13. The method of claim 12, wherein the adhesive element is any one of a sticker, a hook-and-loop-fastener, a magnet or a sucker.

* * * * *